United States Patent
Liu et al.

(10) Patent No.: US 11,454,305 B1
(45) Date of Patent: Sep. 27, 2022

(54) JAM FREE LINEAR ACTUATION SYSTEM IMPLEMENTING A MECHANICAL DISENGAGEMENT MECHANISM AND PROCESS THEREOF

(71) Applicant: Whippany Actuation Systems LLC, Whippany, NJ (US)

(72) Inventors: Shijie Liu, Florham Park, NJ (US); Kurt Goldhammer, Long Branch, NJ (US); Douglas Campbell, Martinsville, NJ (US); Philip DeMauro, Toms River, NJ (US); Philip Chivily, Verona, NJ (US)

(73) Assignee: WHIPPANY ACTUATION SYSTEMS LLC, Whippany, NJ (US)

( * ) Notice: Subject to any disclaimer, the term of this patent is extended or adjusted under 35 U.S.C. 154(b) by 0 days.

(21) Appl. No.: 17/345,146

(22) Filed: Jun. 11, 2021

(51) Int. Cl.
*F16H 25/20* (2006.01)
*F16H 25/24* (2006.01)
*B64C 13/50* (2006.01)
*B64C 9/00* (2006.01)

(52) U.S. Cl.
CPC ........... *F16H 25/205* (2013.01); *B64C 13/50* (2013.01); *F16H 25/2472* (2013.01); *B64C 9/00* (2013.01); *B64C 2009/005* (2013.01); *F16H 2025/209* (2013.01); *F16H 2025/2046* (2013.01); *F16H 2025/2084* (2013.01)

(58) Field of Classification Search
CPC ............... F16H 25/205; F16H 25/2472; F16H 2025/2046; F16H 2025/2048; F16H 2025/209; B64C 13/50; B64C 9/00; B64C 2009/005
See application file for complete search history.

(56) References Cited

U.S. PATENT DOCUMENTS

| | | | |
|---|---|---|---|
| 5,214,972 A | 6/1993 | Larson et al. | |
| 9,920,852 B2 * | 3/2018 | Garrone | F16K 31/046 |
| 9,988,143 B2 * | 6/2018 | Allwein | B64C 25/30 |
| 10,040,539 B2 * | 8/2018 | Antunes | F16H 25/2472 |
| 10,689,097 B2 * | 6/2020 | Nfonguem | F16H 25/205 |
| 10,837,529 B2 * | 11/2020 | Macias Cubeiro | B64D 29/08 |
| 10,907,712 B2 * | 2/2021 | Bastide | F16H 25/20 |
| 10,974,846 B2 * | 4/2021 | Hale | F16H 25/205 |
| 11,218,052 B2 * | 1/2022 | Gassner | H01R 13/627 |
| 11,254,420 B2 * | 2/2022 | Antraygue | B64C 13/16 |

(Continued)

OTHER PUBLICATIONS

International Patent Application No. PCT/US2022/032035; Int'l Search Report and the Written Opinion; dated Jul. 11, 2022; 6 pages.

*Primary Examiner* — David M Fenstermacher
(74) *Attorney, Agent, or Firm* — BakerHostetler

(57) ABSTRACT

A jam free linear actuator system includes a linear electro-mechanical actuator configured to actuate a component; a disengagement mechanism configured to disengage components of the linear electro-mechanical actuator in an event of a jammed failure; a fixed end fitting mechanical connection; and a trim end fitting mechanical connection. The fixed end fitting mechanical connection connects the linear electro-mechanical actuator to a portion of a system implementing the linear electro-mechanical actuator; and the trim end fitting mechanical connection connects the linear electro-mechanical actuator to the component.

15 Claims, 8 Drawing Sheets

(56) References Cited

U.S. PATENT DOCUMENTS

2011/0226075 A1* 9/2011 Nguyen ................ B64C 13/50
74/89.38
2016/0025199 A1* 1/2016 Boone .................... H02K 7/116
74/89.38

* cited by examiner

JAM FREE LINEAR ACTUATION SYSTEM IMPLEMENTING A MECHANICAL DISENGAGEMENT MECHANISM AND PROCESS THEREOF

FIELD OF THE DISCLOSURE

The disclosure relates to a jam free linear actuation system. In particular, the disclosure relates to a jam free linear actuation system implementing a mechanical disengagement mechanism. The disclosure also relates to a process of implementing a jam free linear actuation system. In particular, the disclosure also relates to a process of implementing a jam free linear actuation system implementing a mechanical disengagement mechanism.

The disclosure further relates to a jam free linear actuation system implemented in an aircraft, an aerospace application, and/or any application requiring a jam free actuation system. In particular, the disclosure further relates to a jam free linear actuation system implementing a mechanical disengagement mechanism implemented in an aircraft, an aerospace application, and/or any application requiring a jam free actuation system. The disclosure moreover relates to a process of implementing a jam free linear actuation system implemented in an aircraft, an aerospace application, and/or any application requiring a jam free actuation system. In particular, the disclosure moreover relates to a process of implementing a jam free linear actuation system implementing a mechanical disengagement mechanism implemented in an aircraft, an aerospace application, and/or any application requiring a jam free actuation system.

BACKGROUND OF THE DISCLOSURE

The predominant actuation technology currently used in aircraft and/or aerospace applications is hydraulic. For example, the predominant flight surface control technology used today is hydraulic. In this regard, a hydraulic actuator can readily be back driven and incorporate dual redundancy. However, a hydraulic actuator also has many inherent problems. For example, a typical hydraulic actuation system has problems such as leaking, high weight penalty, high demand maintenance, higher failure rate, and so on.

Electro-mechanical actuation (EMA) is being required more and more by the aircraft industry due to its inherent low cost, advantageous low weight, low maintenance, and/or the like. This increased demand for EMA is extending into high reliability applications and/or critical applications, such as aerospace flight controls. Actuator failure in high reliability applications and/or critical applications is very undesirable and may present a safety concern as well as the possibility of equipment damage.

Accordingly, in order to address the need for low failure rates, dual-redundant actuators are employed. However, a limitation of many dual-redundant actuation system design configurations is a situation where if one actuator lane becomes jammed. In this regard, the jammed primary lane consequently jams the secondary lane since they are typically both linked to the same structural member.

Accordingly, it would be desirable to have a device, means, and/or process to circumvent a lane jam in implementations of a high reliability dual redundant electro-mechanical actuator. In this regard, such a device, means, and/or process to circumvent a lane jam in implementations of a high reliability dual redundant electro-mechanical actuator is critical to achieve a higher reliability, increase safety, limit equipment damage, and/or the like.

SUMMARY OF THE DISCLOSURE

The foregoing needs are met, to a great extent, by the disclosure, which describes such a device, means, and/or process to circumvent a lane jam in implementations of a high reliability dual redundant electro-mechanical actuator.

One aspect includes a jam free linear actuator system that includes a linear electro-mechanical actuator configured to actuate a component; a disengagement mechanism configured to disengage components of the linear electro-mechanical actuator in an event of a jammed failure; a fixed end fitting mechanical connection; and a trim end fitting mechanical connection, where the fixed end fitting mechanical connection connects the linear electro-mechanical actuator to a portion of a system implementing the linear electro-mechanical actuator; and where the trim end fitting mechanical connection connects the linear electro-mechanical actuator to the component.

One aspect includes a jam free linear actuator system that includes a linear electro-mechanical actuator configured to actuate a component; a disengagement mechanism configured to disengage components of the linear electro-mechanical actuator in an event of a jammed failure; a fixed end fitting mechanical connection; and a trim end fitting mechanical connection, where the linear electro-mechanical actuator that includes an actuator screw; and an actuation motor configured to drive the actuator screw in order to change relative positions of the fixed end fitting mechanical connection with respect to the trim end fitting mechanical connection in order to operate the component; where the fixed end fitting mechanical connection connects the linear electro-mechanical actuator to a portion of a system implementing the linear electro-mechanical actuator; and where the trim end fitting mechanical connection connects the linear electro-mechanical actuator to the component.

One aspect includes a jam free linear actuator system that includes a linear electro-mechanical actuator configured to actuate a component; a disengagement mechanism configured to disengage components of the linear electro-mechanical actuator in an event of a jammed failure; a fixed end fitting mechanical connection; a trim end fitting mechanical connection; and an actuation motor configured to drive various components of the linear electro-mechanical actuator in order to change relative positions of the fixed end fitting mechanical connection with respect to the trim end fitting mechanical connection in order to operate the component, where the linear electro-mechanical actuator that includes an actuator screw; and an actuation motor configured to drive the actuator screw in order to change relative positions of the fixed end fitting mechanical connection with respect to the trim end fitting mechanical connection in order to operate the component; where the fixed end fitting mechanical connection connects the linear electro-mechanical actuator to a portion of a system implementing the linear electro-mechanical actuator; and where the trim end fitting mechanical connection connects the linear electro-mechanical actuator to the component.

One aspect includes a jam free linear actuator system that includes a linear electro-mechanical actuator configured to actuate a component; a disengagement mechanism configured to disengage components of the linear electro-mechanical actuator in an event of a jammed failure; a fixed end fitting mechanical connection; a trim end fitting mechanical connection; an actuation motor configured to drive various components of the linear electro-mechanical actuator in order to change relative positions of the fixed end fitting mechanical connection with respect to the trim end fitting mechanical connection in order to operate the component; and the linear electro-mechanical actuator that includes an actuator screw; and an actuation motor configured to drive the actuator screw in order to change relative positions of the fixed end fitting mechanical connection with respect to the trim end fitting mechanical connection in order to operate the component; transmission components configured to connect the actuation motor to the actuator screw, where transmission components are configured transfer a rotation of the actuation motor to the actuator screw, where the fixed end fitting mechanical connection connects the linear electro-mechanical actuator to a portion of a system implementing the linear electro-mechanical actuator; and where the trim end fitting mechanical connection connects the linear electro-mechanical actuator to the component.

There has thus been outlined, rather broadly, certain aspects of the disclosure in order that the detailed description thereof may be better understood herein, and in order that the present contribution to the art may be better appreciated. There are, of course, additional aspects of the disclosure that will be described below and which will form the subject matter of the claims appended hereto.

In this respect, before explaining at least one aspect of the disclosure in detail, it is to be understood that the disclosure is not limited in its application to the details of construction and to the arrangements of the components set forth in the following description or illustrated in the drawings. The disclosure is capable of aspects in addition to those described and of being practiced and carried out in various ways. Also, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods, and systems for carrying out the several purposes of the disclosure. It is important, therefore, that the claims be regarded as including such equivalent constructions insofar as they do not depart from the spirit and scope of the disclosure.

DETAILED DESCRIPTION

Figure 1:
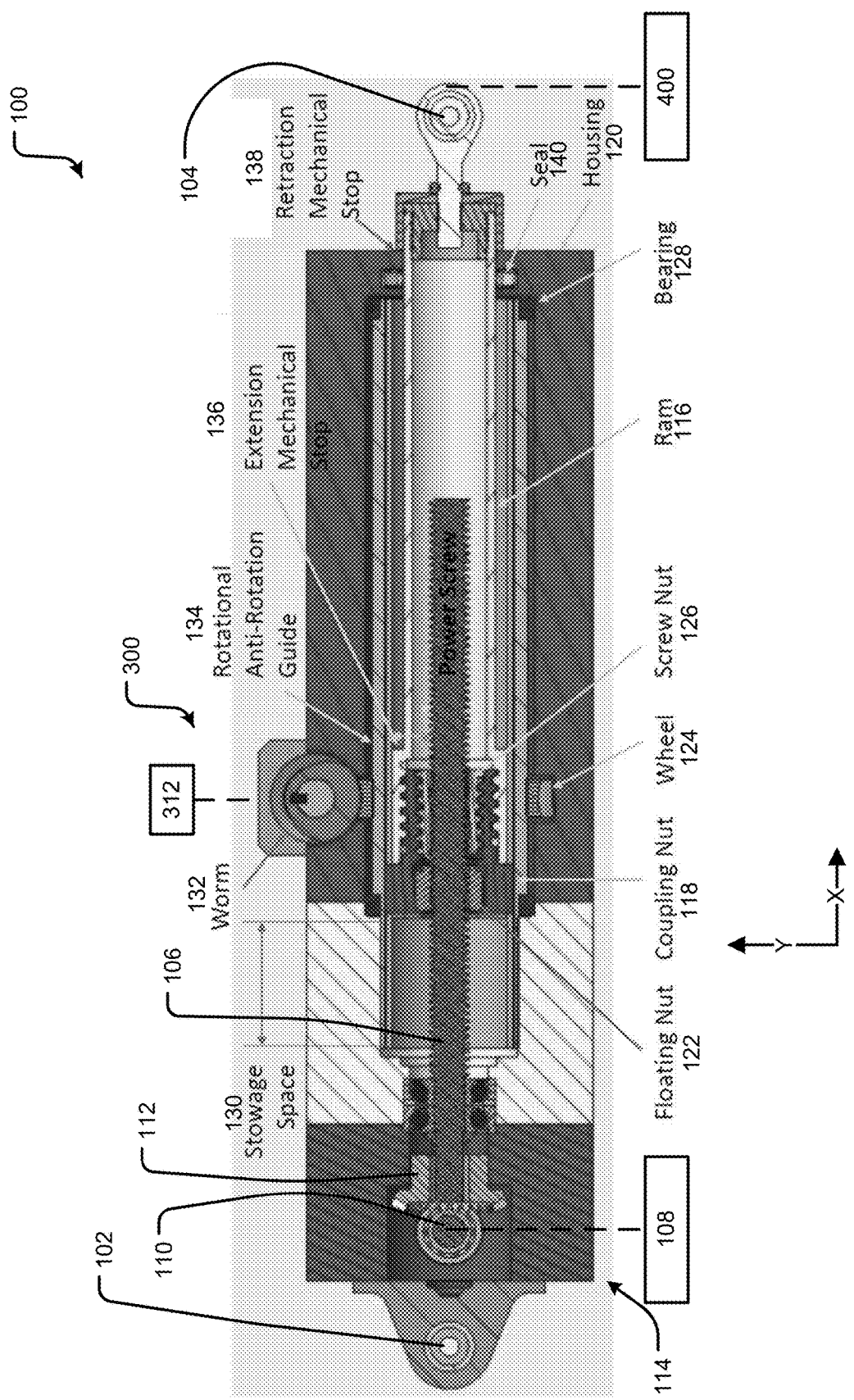
FIG. 1 illustrates a cross-sectional side view of a linear actuation system according to an aspect of the disclosure.

The disclosure will now be described with reference to the drawing Figures, in which like reference numerals refer to like parts throughout. Various aspects of the disclosure advantageously provide a transmission that provides redundant drives for an actuator.

FIG. 1 illustrates a cross-sectional side view of a linear actuation system according to an aspect of the disclosure.

In particular, FIG. 1 illustrates a linear actuation system 100. The linear actuation system 100 may operate to actuate a component 400. In particular, the linear actuation system 100 may be configured as a linear electro-mechanical actuator configured with a disengagement mechanism 300 to disengage various components of the linear actuation system 100 in the event of a jammed failure, which may allow components of the linear actuation system 100 to be back driven or move. More specifically, the linear actuation system 100 may be configured as a linear electro-mechanical actuator configured with the disengagement mechanism 300 to disengage components of the linear actuation system 100, such as a ram from a screw nut or the like, in the event of a jammed failure. This will free the components of the linear actuation system 100, such as the ram, to be back driven. Additionally, this will allow the component 400 to be operated and not be jammed based on a jammed condition of the linear actuation system 100. In certain aspects, a secondary lane system may operate the component 400 in the event the linear actuation system 100 is jammed and disengaged from the component 400. In certain aspects, the secondary lane system may be a redundant installation of the linear actuation system 100. In certain aspects, the secondary lane system may be another type actuation system.

Further, the disclosure presented here is an implementation of the linear actuation system 100 with the disengagement mechanism 300, a component having disengaging capability, and/or the component implementing disengagement functionality. More specifically, the disclosure presented relates to an implementation of the linear actuation system 100, which in certain aspects is a Linear Electro-Mechanical Actuator with a ram disengaging capability. With these design features, the linear electro-mechanical actuation, such as the linear actuation system 100 as described herein, becomes a viable approach to meet the high reliability requirements of primary flight surface control, such as the component 400 as described herein.

In one aspect, the linear actuation system 100 may be configured to actuate the component 400 that includes, is connected to, and/or operates a control surface, a flight surface for an aircraft, and/or the like. In one aspect, the linear actuation system 100 may be configured to actuate the component 400 that may include one or more of a flight surface for an aircraft including one or more of an aileron, an elevator, a rudder, a ruddervator, leading-edge flaps, leading-edge slats, ground spoilers, an inboard flap, an inboard aileron, an inboard aileron tab, an outboard flap, a balance tab, an outboard aileron, a flight spoiler, a trim tab, slats, air brakes, an elevator trim, a control horn, a rudder trim, an aileron trim, and/or the like. In one aspect, the actuator may be configured to actuate a component for an aircraft such as thrust reversers, weapons systems, in-flight fueling systems, tail hook arrest systems, landing gear systems, doors, hatches, and/or the like. In this regard, the linear actuation system 100 is especially configured and/or beneficial to aircraft systems where reliability, weight, and/or the like are of greater importance.

The linear actuation system 100 may be implemented using a number of different components and technologies. In one aspect, the linear actuation system 100 may include a fixed end fitting mechanical connection 102, a trim end fitting mechanical connection 104, an actuator power screw 106, and an actuation gear train 108. The fixed end fitting mechanical connection 102 may connect the linear actuation system 100 to a portion of a system implementing the linear actuation system 100. For example, the fixed end fitting mechanical connection 102 may connect the linear actuation system 100 to a hard point in an aircraft. The fixed end fitting mechanical connection 102 may include various structural configurations for receiving and/or connecting to the portion of the system with one or more mechanical fasteners and/or the like.

The trim end fitting mechanical connection 104 may connect the linear actuation system 100 to the component 400. The trim end fitting mechanical connection 104 may include various structural configurations for receiving and/or connecting to the component 400 with one or more mechanical fasteners and/or the like. Additionally, it should be noted that the functionality of the trim end fitting mechanical connection 104 and the fixed end fitting mechanical connection 102 may be reversed.

The linear actuation system 100 may further connect to the actuation gear train 108. In particular, the actuation gear train 108 may drive various components of the linear actuation system 100 in order to change the relative positions of the fixed end fitting mechanical connection 102 with respect to the trim end fitting mechanical connection 104 in order to operate the component 400. More specifically, the actuation gear train 108 may drive various components of the linear actuation system 100 in order to change the relative positions of the fixed end fitting mechanical connection 102 with respect to the trim end fitting mechanical connection 104 along an axis parallel to the X-axis in order to operate the component 400.

In one aspect, the linear actuation system 100 may further connect to the actuation gear train 108 such that the actuation gear train 108 may drive the actuator power screw 106 as well as other various components of the linear actuation system 100 in order to change the relative positions of the fixed end fitting mechanical connection 102 with respect to the trim end fitting mechanical connection 104 in order to operate the component 400.

The linear actuation system 100 may further include transmission components 114 connecting the actuation gear train 108 to the actuator power screw 106. The transmission components 114 may include any type of component or technology to transfer a rotation of the actuation gear train 108 to the actuator power screw 106. In various aspects, the transmission components 114 connecting the actuation gear train 108 to the actuator power screw 106 may include a shaft driven gear 110 that engages a power screw gear 112. In this regard, the transmission components 114, the shaft driven gear 110, and/or the power screw gear 112 may operate to deliver a driven rotation of the actuation gear train 108 to the actuator power screw 106 in order to change the relative positions of the fixed end fitting mechanical connection 102 with respect to the trim end fitting mechanical connection 104 in order to operate the component 400. In this regard, the power screw gear 112 and/or the actuator power screw 106 may be supported within the linear actuation system 100 by bearings or other structure to allow rotation thereof. However, it should be appreciated that the disclosure contemplates alternative components and implementations.

The linear actuation system 100 may further include a ram 116, a coupling nut 118, a screw nut 126, and a housing 120. The ram 116 may be connected to the trim end fitting mechanical connection 104 and may extend the trim end fitting mechanical connection 104 from the housing 120 along an axis parallel to the x-axis. The ram 116 may be connected to the actuator power screw 106 through the coupling nut 118 and the screw nut 126. More specifically, during normal operation of the linear actuation system 100, the actuation gear train 108 may operate through the transmission components 114 to rotate the actuator power screw 106 to move the coupling nut 118 and the screw nut 126 within the housing 120 in order to extend the trim end fitting mechanical connection 104 for operation of the component 400. In particular, the actuator power screw 106 may rotate within the housing 120 about an axis of rotation parallel to the X-axis. The actuator power screw 106 may have external threads along the length of the axis that is parallel to the X-axis. Moreover, the external threads of the actuator power screw 106 may engage internal threads of the screw nut 126 to move the ram 116 through the coupling nut 118 and the trim end fitting mechanical connection 104.

Additionally, the housing 120 may include a seal 140 that may engage an outer surface of the ram 116 and partially support the ram 116 within the housing 120. The trim end fitting mechanical connection 104 may be connected to the ram 116 directly or by one or more fastening features, components, and/or the like. For example, the trim end fitting mechanical connection 104 may be connected to the ram 116 by various threaded structures.

In further aspects of the disclosure, the linear actuation system 100 may include a floating nut 122, a wheel 124, a screw nut 126, bearings 128, a stowage space 130, a worm 132, a rotational anti-rotation guide 134, an extension mechanical stop 136, and a retraction mechanical stop 138. In this regard, the disengagement mechanism 300 of the linear actuation system 100 may include one floating nut 122, the wheel 124, the combination of the screw nut 126 and the coupling nut 118, the bearings 128, the stowage space 130, the worm 132, the rotational anti-rotation guide 134, the extension mechanical stop 136, and the retraction mechanical stop 138. However, the disengagement mechanism 300 may be implemented utilizing a number of different alternative components, constructions, and/or the like.

Figure 3:
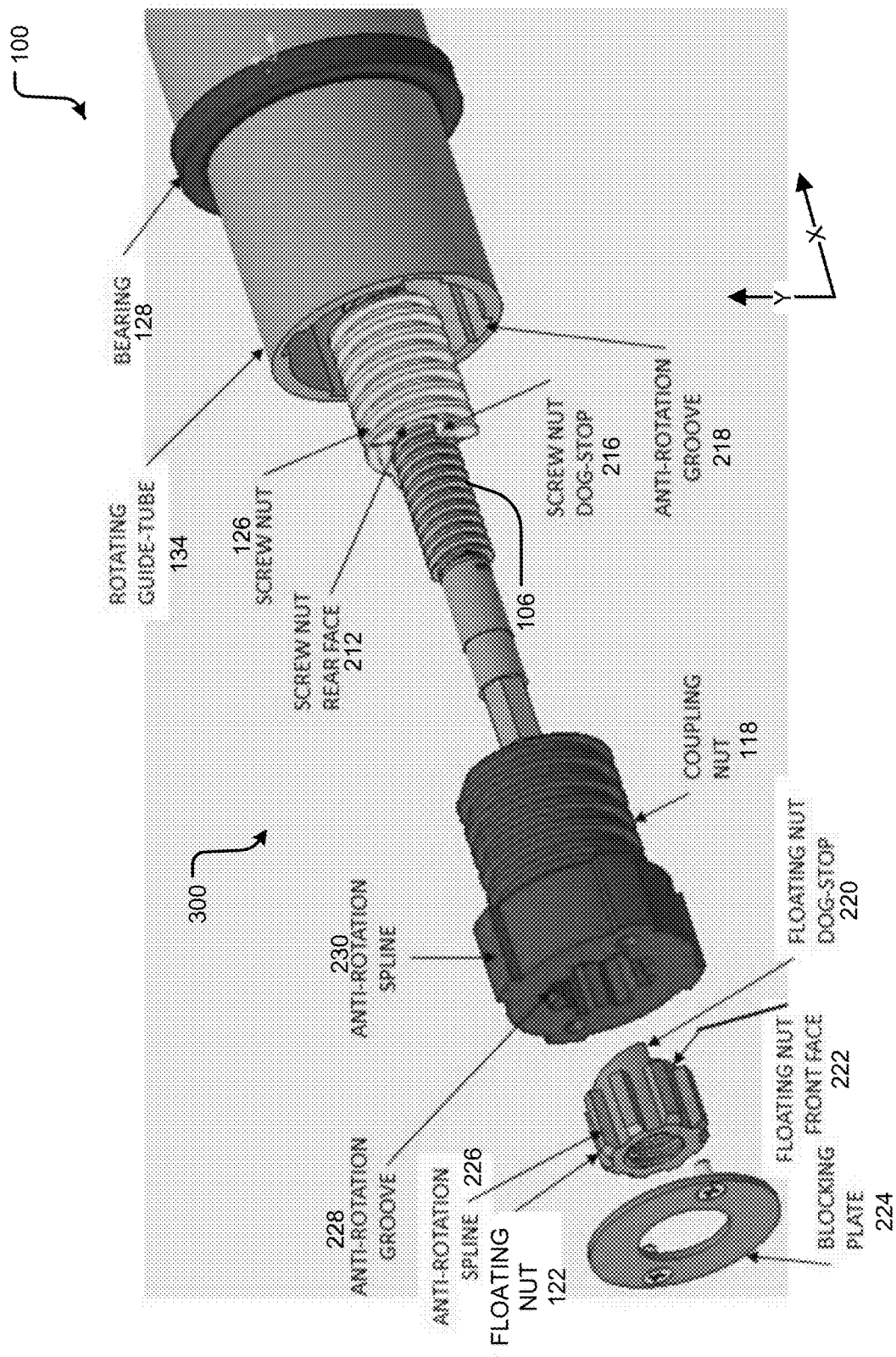
FIG. 3 illustrates a partial perspective exploded view of the linear actuation system of FIG. 1.

As illustrated in FIG. 1 and with reference to FIG. 3, the coupling nut 118 may be arranged around the actuator power screw 106. The coupling nut 118 may have outside diameter threads along one end thereof along an axis parallel to the X-axis as shown in FIG. 1. The outside diameter threads on the coupling nut 118 may engage threads on an internal diameter of the ram 116. Accordingly, the coupling nut 118 and the ram 116 are threadingly engaged with one another. In particular, the coupling nut 118 and the ram 116 are threadingly engaged with one another during normal operation.

Within the coupling nut 118 may be arranged on the floating nut 122. In particular, the floating nut 122 may be arranged within an internal diameter of the coupling nut 118. The floating nut 122 may have threads that engage the outside diameter threads of the actuator power screw 106. The coupling nut 118 may further be configured to receive the screw nut 126 within an internal diameter thereof. The coupling nut 118 may further include internal threads and the screw nut 126 may include corresponding outer diameter threads to engage the internal threads of the screw nut 126. Accordingly, the coupling nut 118 may couple the floating nut 122, the screw nut 126, and/or the ram 116

The linear actuation system 100 may further include the rotational anti-rotation guide 134. The rotational anti-rotation guide 134 may be arranged within the housing 120. The rotational anti-rotation guide 134 may be supported within the housing 120 on the bearings 128. In particular, one end of the rotational anti-rotation guide 134 may include a first one of the bearings 128 and an opposite end of the rotational anti-rotation guide 134 may include a second one of the bearings 128. The rotational anti-rotation guide 134 may hold the floating nut 122, the coupling nut 118, the screw nut 126, and the ram 116. Additionally, the rotational anti-rotation guide 134 may receive in part the actuator power screw 106.

Additionally, the ram 116 may include the extension mechanical stop 136 arranged on an outside diameter thereof. In particular, the extension mechanical stop 136 may be a portion of the ram 116 between a larger diameter portion and a smaller diameter portion. The housing 120 may further include the retraction mechanical stop 138 arranged adjacent the trim end fitting mechanical connection 104. Moreover, the housing 120 may also have the worm 132 that interacts with the wheel 124. The wheel 124 may be arranged and engaged with the rotational anti-rotation guide 134. In particular, rotation of the worm 132 about an axis perpendicular to the y-axis and x-axis results in a rotation of the wheel 124 about the x-axis. Moreover, a rotation of the wheel 124 about the x-axis results in a rotation of the rotational anti-rotation guide 134 about the x-axis. The worm 132 may be driven by a disengagement motor 312 or other drive source. However, it should be noted that the worm 132 and the wheel 124 may be replaced by other types of drive mechanisms along with a locking means during normal operation. The locking means may be implemented as a locking device. In particular, the locking device may be implemented by one or more of a motor, a brake, and/or the like. In particular aspects, the brake may be used and configured as the locking device.

Figure 2:
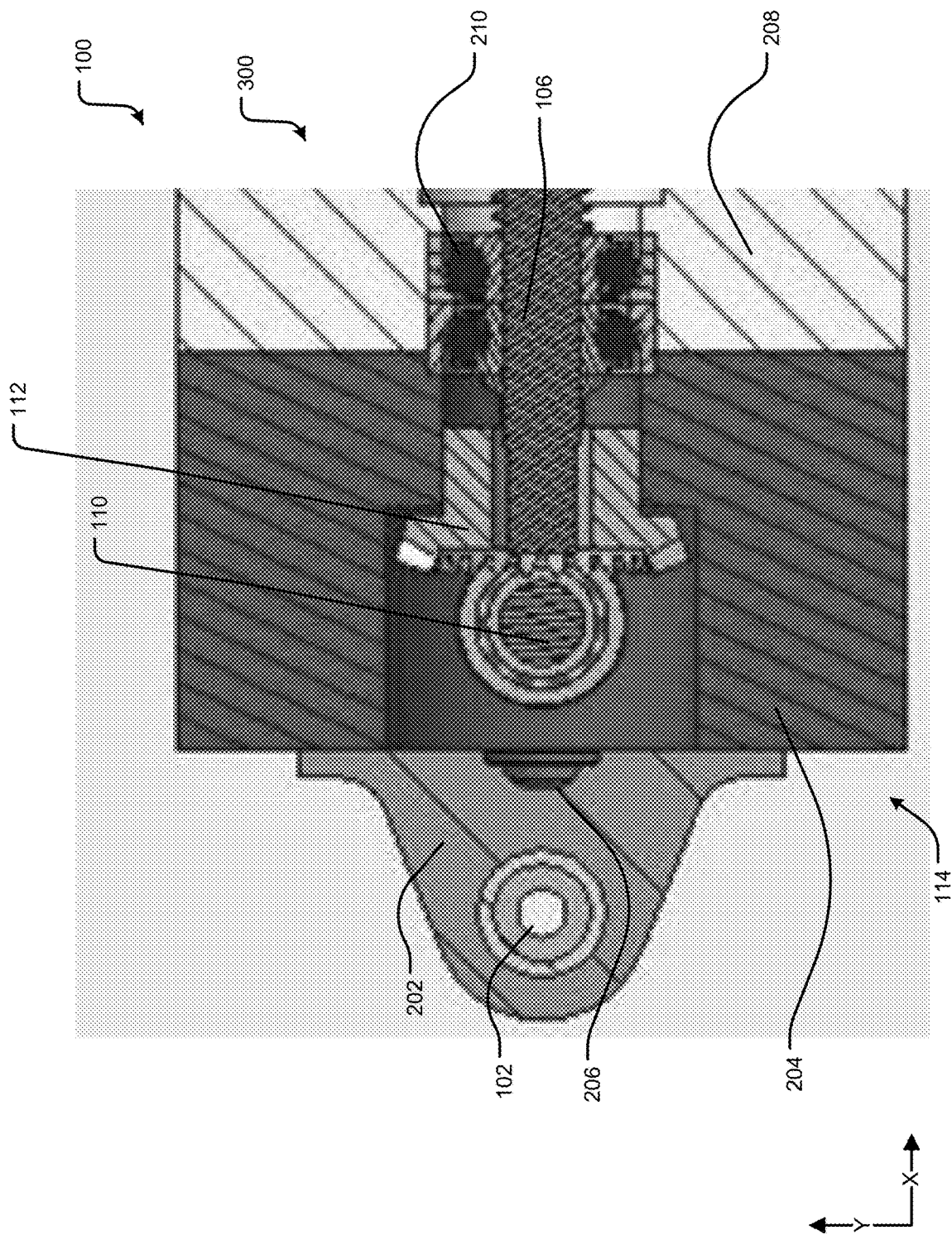
FIG. 2 illustrates a detailed cross-sectional side view of the linear actuation system of FIG. 1.

FIG. 2 illustrates a detailed cross-sectional side view of the linear actuation system of FIG. 1.

In particular, FIG. 2 illustrates further details of the linear actuation system 100. In particular, the fixed end fitting mechanical connection 102 may be implemented in part with a connection structure 202 that connects the fixed end fitting mechanical connection 102 to the linear actuation system 100. More specifically, the connection structure 202 may connect the fixed end fitting mechanical connection 102 to a housing portion 204 of the linear actuation system 100. The connection of the connection structure 202 to the housing portion 204 may be through a mechanical fastener 206. In one aspect, the connection structure 202 may include in part a plate structure.

FIG. 2 further illustrates that the housing portion 204 may be connected to a housing portion 208. The housing portion 204 and the housing portion 204 may be two separate structures or alternatively may be a combined structure. The housing portion 204 may house at least in part the transmission components 114, the shaft driven gear 110, and/or the power screw gear 112. The actuator power screw 106 may extend into the housing portion 204 to connect to the power screw gear 112, the shaft driven gear 110, and/or the transmission components 114. The shaft driven gear 110 may rotate about an axis perpendicular to the y-axis and x-axis and engage the power screw gear 112; and the power screw gear 112 may rotate about an axis parallel to the x-axis.

The housing portion 208 may also hold the actuator screw 106 as well as one or more bearings 210. The one or more bearings 210 may support the actuator power screw 106, the power screw gear 112, as well as other portions of the transmission components 114 for rotation.

FIG. 3 illustrates a partial perspective exploded view of the linear actuation system of FIG. 1.

In particular, FIG. 3 illustrates that the floating nut 122 may include an anti-rotation external spline 226 and a floating nut front face 222. As previously noted, the floating nut 122 is configured to be arranged within the coupling nut 118. The coupling nut 118 may include an anti-rotation external spline 230 on an external diameter thereof. Additionally, the coupling nut 118 may include an anti-rotation internal spline 228 arranged on an internal diameter thereof. The anti-rotation external spline 226 of the floating nut 122 may be configured to engage the anti-rotation internal spline 228 of the coupling nut 118 and prevent rotation of the floating nut 122 with respect to the coupling nut 118 during normal operation.

With further reference to FIG. 3, all threads of the actuator power screw 106, the coupling nut 118, and the screw nut 126 may have the same direction and lead. The coupling nut 118 may have an external anti-rotation feature that may include the anti-rotation external spline 230, which may engage with the anti-rotation feature of the rotational anti-rotation guide 134. The floating nut 122 may also have the anti-rotation external spline 226 engage with the anti-rotation internal spline 228 of the coupling nut 118.

Additionally, the linear actuation system 100 may include a blocking plate 224 that may be mechanically fastened to a face of the coupling nut 118. The blocking plate 224 may be used to block the floating nut 122 from backing off the coupling nut 118. The thread fit between the coupling nut 118 and the screw nut 126 and the coupling nut 118 may be close-clearance to minimize end play and to prevent the screw nut 126 from rotating under gravity when the linear actuation system 100 faces directly down (normal) to the earth. In particular aspects, the screw nut 126 and the coupling nut 118 may be close-clearance to minimize end play and to prevent the screw nut 126 from rotating under gravity when the linear actuation system 100 faces directly down (normal) to the earth even in efficient implementations such as ball screw.

The floating nut 122 may have a coarse thread, meaning there is greater thread clearance between the floating nut 122 and the actuator power screw 106 than for the screw nut 126. Since the screw nut 126 may always have a fit tighter than the floating nut 122, and the floating nut 122 may be splined with the anti-rotation external spline 226 on the coupling nut 118, and the floating nut 122 may float on the actuator power screw 106. As a result, there may be no axial load on the floating nut 122.

The rotational anti-rotation guide 134 may include an anti-rotation groove 218. The anti-rotation groove 218 may be configured to engage with the anti-rotation external spline 230 of the coupling nut 118. In particular, the engagement of the anti-rotation external spline 230 of the coupling nut 118 with the anti-rotation groove 218 of the rotational anti-rotation guide 134 prevents rotation of the coupling nut 118 with respect to the anti-rotation groove 218 while the anti-rotation external spline 230 is engaged with the anti-rotation groove 218.

As previously mentioned, the disclosure presented here is an implementation of the linear actuation system 100 with a component disengaging capability, disconnect functionality, and/or the disengagement mechanism 300, hereinafter the disengagement mechanism 300 for brevity. In this regard, implementation of the disengagement mechanism 300 may include implementing the coupling nut 118 between the screw nut 126 and the ram 116. As described in further detail herein, the coupling nut 118 may be operated to be disengaged from the actuator power screw 106. Once the coupling nut 118 is disengaged from the screw nut 126 and the ram 116, the ram 116 may be free and will have the full stroke capability regardless the location of the screw nut 126. In other words, the linear actuation system 100 that has been operationally jammed may now be disengaged such that the component 400 may be operated.

In this regard, as described herein the rotational anti-rotation guide 134 may be configured to become a "rotational anti-rotation guide," which may be engaged with the coupling nut 118. The linear actuation system 100 may include a locking mechanism. In this regard, the locking mechanism may be implemented a number of different ways. In one aspect, the locking mechanism may be implemented by the worm 132 and the wheel 124 along with a positive locking device such as a brake, which may be implemented on the rotational anti-rotation guide 134. In this regard, the worm 132 and the wheel 124 may be driven and rotate as described herein by the disengagement motor 312 such as a motor/brake or the like and may likewise drive and rotate the rotational anti-rotation guide 134.

To disengage the ram 116 (in the event of jam); the rotational anti-rotation guide 134 may be rotated. The rotational anti-rotation guide 134 may be driven/rotated by a separate motor through a gear train such as the disengagement motor 312. This drive path, in normal operation, may be locked by a positive locking device.

Under normal operation, the screw nut 126, when driven by the actuator power screw 106 through gear train, will experience a rotational torque. Correspondingly, through friction the screw nut 126 may impart a torque to the coupling nut 118. However, the coupling nut 118 may have an anti-rotation feature and may be restrained from rotation by the rotational anti-rotation guide 134. In addition, when the actuator power screw 106 rotates, the floating nut 122 may also experience rotational torque. Since the floating nut 122 is splined on the coupling nut 118, there is no relative rotational motion between the coupling nut 118 and the floating nut 122. Therefore, the screw nut 126 may not separate from the coupling nut 118. As a result, the nut assembly that includes one or more of the screw nut 126, the coupling nut 118, the floating nut 122, and/or the like can only travel axially on the power screw 106 as one piece, like a normal implementation of the screw nut 126 by itself.

Figure 4:
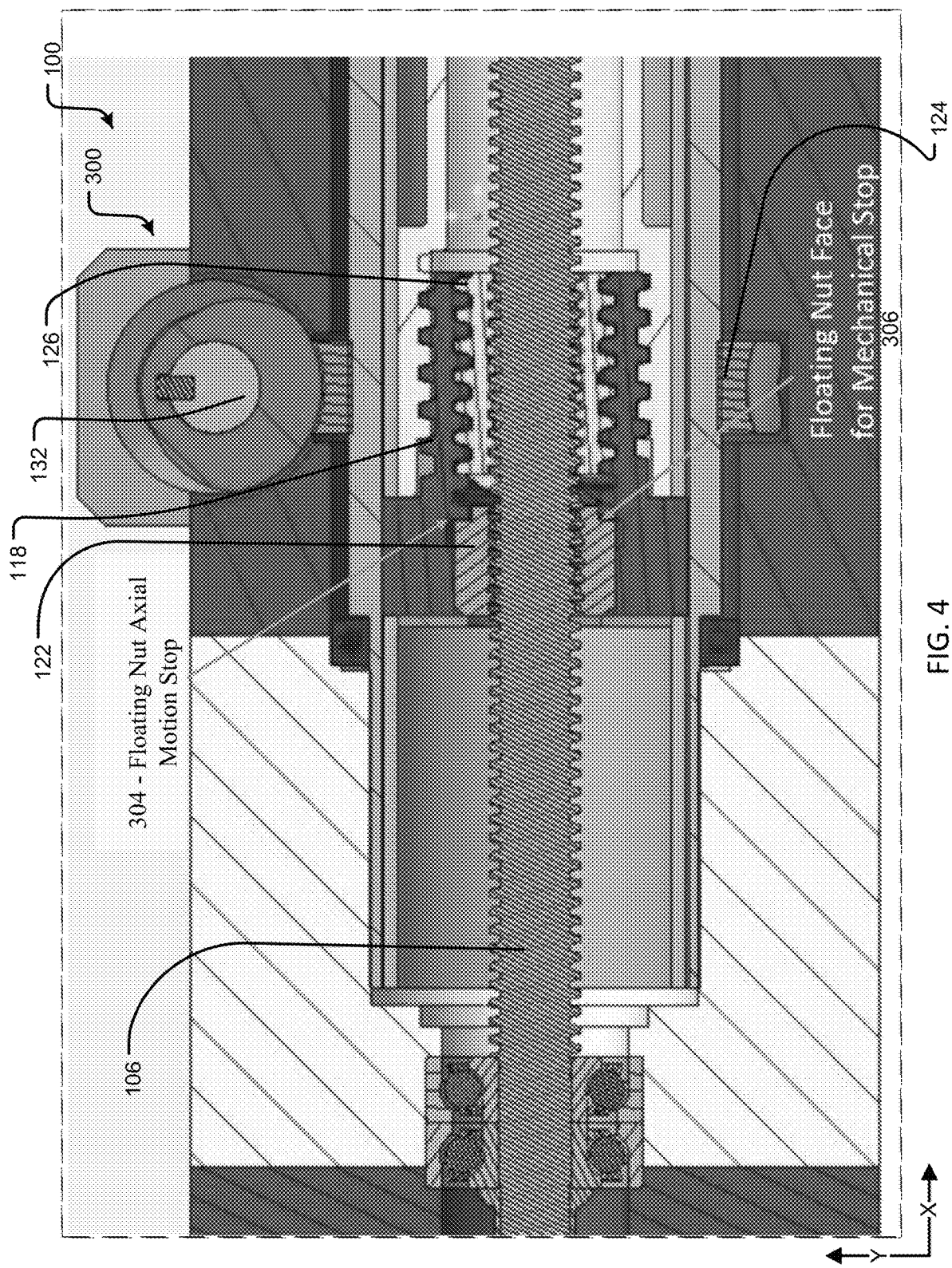
FIG. 4 illustrates a detailed cross-sectional side view of the linear actuation system of FIG. 1 in an operating mode.

FIG. 4 illustrates a detailed cross-sectional side view of the linear actuation system of FIG. 1 in an operating mode.

To maintain the position accuracy, there may be a minimum gap between "Dog Stops" and the minimum gap between a floating nut axial motion stop 304 and a floating nut face for mechanical stop 306, as shown in FIG. 4.

In the event of lacking enough friction between the actuator power screw 106 and the screw nut 126, as well as between the screw nut 126 and the coupling nut 118, the actuator power screw 106 may have a trend to move out of the coupling nut 118 (right direction) while rotating, or to move deeper inside the coupling nut 118 (left direction) while rotating depending on the actuator power screw 106 rotation.

In a situation when the screw nut 126 tends to move to right, the floating nut 122 also could move to right. However, once the floating nut front face 222 of the floating nut 122 "hits" the coupling nut 118 and/or the floating nut axial motion stop 304, the floating nut 122 will impart the torque to the rotational anti-rotation guide 134 through the coupling nut 118. The coupling nut 118 will start to move in the same direction and prevent the screw nut 126 moving out of the coupling nut 118.

In a situation when the screw nut 126 tends to move to left, either the "Dog Stops" will meet first or the floating nut 122 will go against the blocking plate 224. Either way, the torque will be imparted on the rotational anti-rotation guide 134 through the coupling nut 118 and cause the coupling nut 118 to move in the same direction. Therefore, there is no further motion between the screw nut 126 and the actuator power screw 106.

Figure 5:
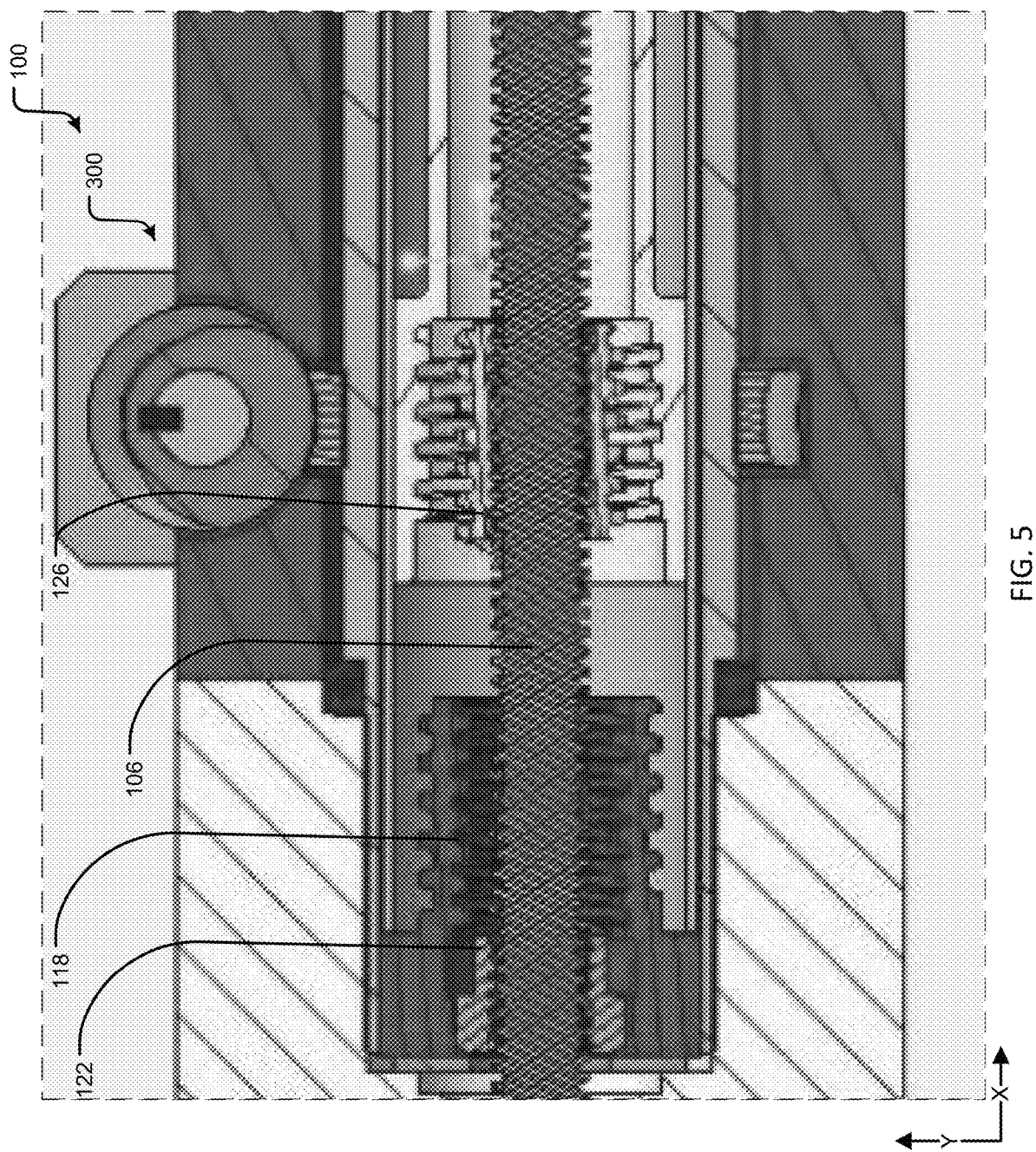
FIG. 5 illustrates a cross-sectional side view of a linear actuation system of FIG. 1 in a disengaged mode for a power screw/nut jam event.
Figure 6:
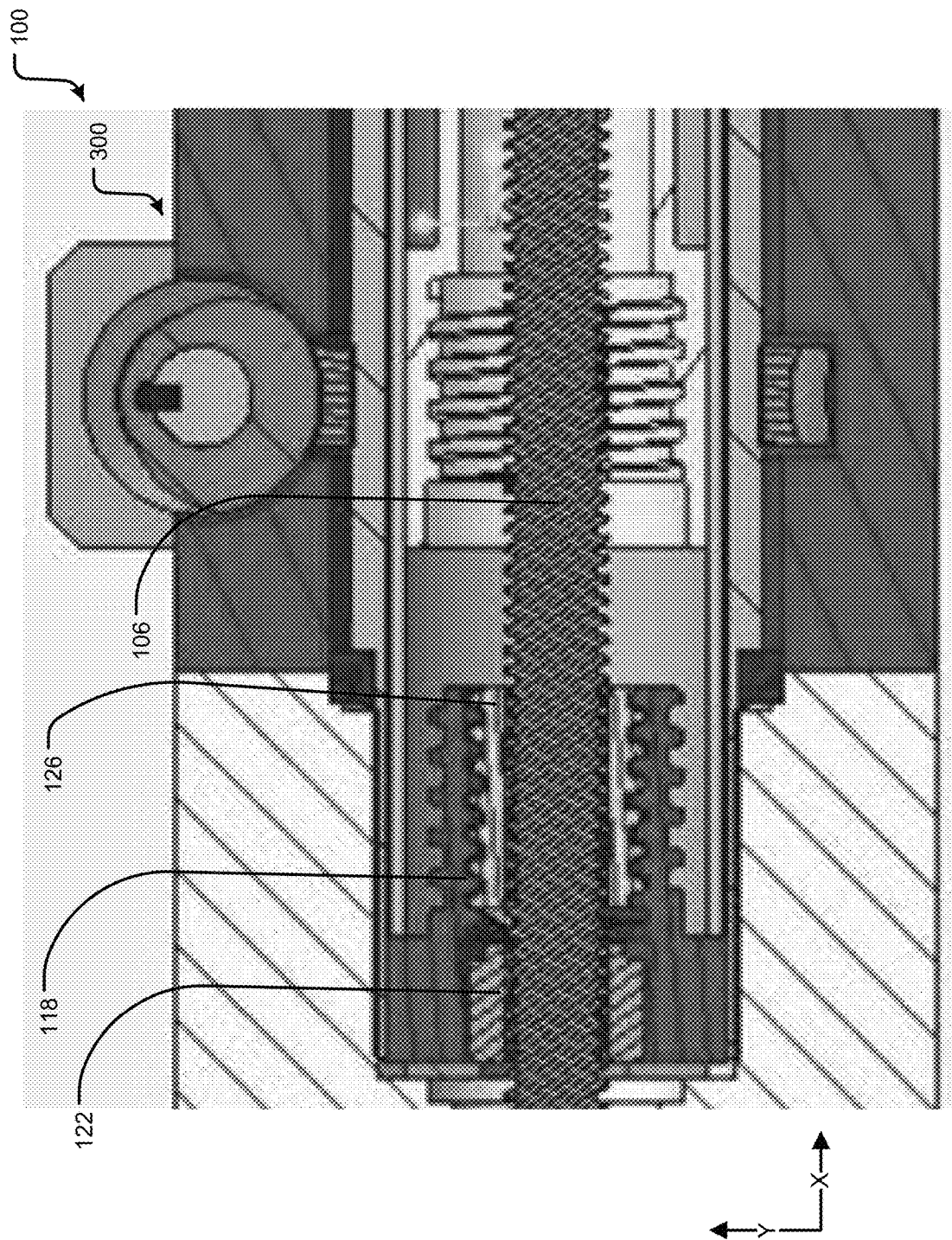
FIG. 6 illustrates a cross-sectional side view of a linear actuation system of FIG. 1 in a disengaged mode for a gear train jam event.

FIG. 5 illustrates a cross-sectional side view of a linear actuation system of FIG. 1 in a disengaged mode for a power screw/nut jamming condition; and FIG. 6 illustrates a cross-sectional side view of a linear actuation system of FIG. 1 in a disengaged mode for a gear train jamming condition.

There are two jamming scenarios: one is the actuator power screw 106 is jammed with the screw nut 126 and the other is a gear train is jammed (the transmission components 114, the shaft driven gear 110, the power screw gear 112, and/or the like). The first scenario is that the actuator power screw 106 and the screw nut 126 are jammed together and there is no relative motion between the actuator power screw 106 and the screw nut 126; and the second scenario is that the gear train is jammed and the actuator power screw 106 is failing to rotate.

Screw Nut Jammed

The screw nut 126 being jammed may mean that there is no relative rotation between the screw nut 126 and the actuator power screw 106. In this case, the screw nut 126 will rotate with the actuator power screw 106 and the coupling nut 118 will translate axially.

If the coupling nut 118 and the floating nut 122 translate to left, the system could disengage itself. However, the system will detect the screw jam once the driving direction is reversed.

If the coupling nut 118 translates to right, the "dog stop" between the screw nut 126 and the floating nut 122 may engage and cause the floating nut 122 to stop moving. Consequently, the coupling nut 118 may stop moving.

Both conditions will generate a position error and such a condition will generate high current in for example the actuation motor. Once the system control electronics detect the jam, it may activate the disengagement mechanism 300.

In this regard, the disengagement motor 312 may drive the rotational anti-rotation guide 134, which turns the coupling nut 118 to disengage from the screw nut 126 and the ram 116. As soon as the coupling nut 118 is disengaged from the screw nut 126 and the ram 116, the ram 116 will be free to move. The disengagement motor 312 may continue to drive the rotational anti-rotation guide 134 until the coupling nut 118 is fully stowed in the stowage space 130, which allows the ram 116 to become totally free (full stroke) as shown in FIG. 5.

Coupling Nut Disengaged and Ram is Free

Gear Train Jammed

The gear train jammed condition may mean that the actuator power screw 106 cannot rotate. Once the system detects the actuation gear train 108 stall current, a position error, and/or the like, the system will activate the disengagement mechanism 300. In one aspect, the disengagement mechanism 300 may operate the disengagement motor 312 to drive the rotational anti-rotation guide 134, which turns the coupling nut 118. In particular, the disengagement motor 312 may rotate the worm 132, which may rotate about an axis perpendicular to the y-axis and the x-axis. Additionally, the worm 132 may be configured with worm gear teeth arranged there around that engage gear teeth on the wheel 124. Finally, the wheel 124 may rotate the rotational anti-rotation guide 134, which turns the coupling nut 118.

The coupling nut 118 may either just rotate to disengage from both the screw nut 126 and the ram 116 as shown in FIG. 5, or it may carry the screw nut 126 and rotate together to disengage from the ram 116 as shown in FIG. 6. The ram 116 may be constrained from rotating by the end-fitting (the 102 or the 104), which is connected to a structure such as the aircraft. As soon as the coupling nut 118 is out of the ram 116, the ram 116 will be free to move. The disengagement motor 312 will continue to drive the rotational anti-rotation guide 134 until the ram 116 becomes totally free (full stroke) as shown in FIG. 6.

As described herein, the linear actuation system 100 may be implemented to provide actuation of the component 400 during typical normal operations while a secondary lane system remains in a standby configuration. More specifically, the linear actuation system 100 may be implemented in an active configuration to provide actuation of the component 400 during typical normal operations while the secondary lane system remains in a standby configuration.

On the other hand, the secondary lane system may provide actuation of the component 400 when the linear actuation system 100 fails, jams, and/or the like. More specifically, the linear actuation system 100 may operate in the active configuration to operate the component 400 by implementing the linear actuation system 100. When the linear actuation system 100 fails, jams, and/or the like, the linear actuation system 100 may implement the disengagement mechanism 300 in order to disengage the linear actuation system 100 from the component 400. Thereafter, the secondary lane system operates the component 400.

Additionally, when a failure of the linear actuation system 100 occurs, for example, failure as described herein, the failure may be detected via a sensor as described herein, a controller as described herein, an output sensor, a motor current monitoring the actuation motor, and/or the like. When the failure is detected, a flight computer, a central maintenance system (CMS), a flight management system (FMS), a flight warning system (FWS), and/or the like may energize the linear actuation system 100 to implement the disengagement mechanism 300 to disengage from the component 400. Thereafter, the secondary lane system may connect to and operate the component 400.

One or more components of the linear actuation system 100 as described herein may be formed of various materials including one or more metals, synthetic materials, composite materials, and/or the like. Additionally, one or more of the components of the linear actuation system 100 as described herein may be cast, machined, stamped, molded, three dimensionally printed, and/or the like.

Figure 7:
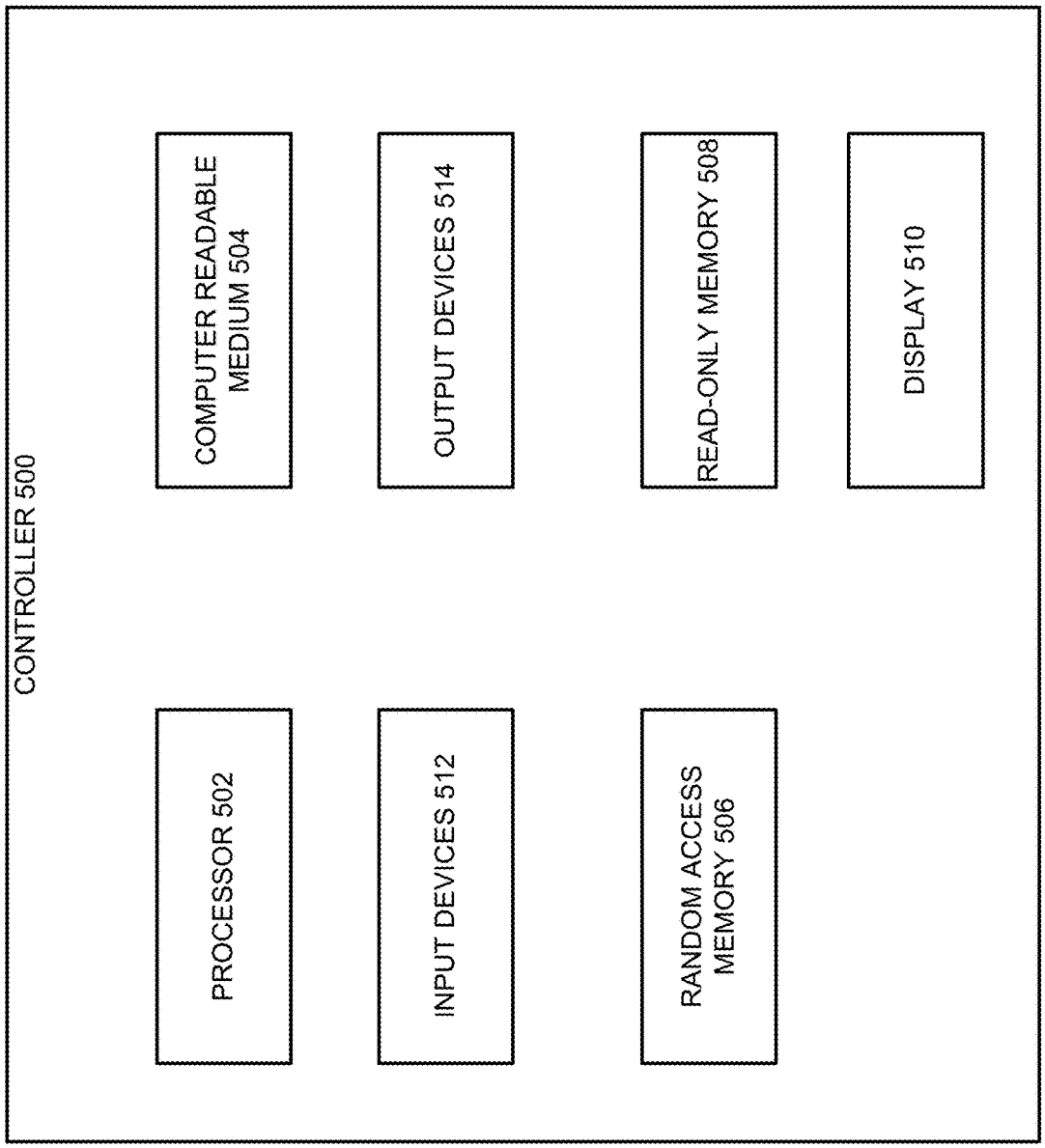
FIG. 7 illustrates a controller according to the disclosure.

FIG. 7 illustrates a controller according to the disclosure.

In particular, FIG. 7 illustrates a controller 500 that may be used with the linear actuation system 100. The controller 500 may include a processor 502 configured to execute instructions stored on computer readable medium 504. In a particular aspect, the controller 500 may be configured to control operation of the linear actuation system 100 and/or the secondary lane system during both the normal operation and the failed operation. In particular, the controller 500 may control operation of the linear actuation system 100 to change from the normal configuration to the disengaged configuration.

In one aspect, the processor 502 implements a jam free actuator process 600 as described below. The instructions may include various commands to control components of the linear actuation system 100. The computer readable medium 504 may be any type of memory known in the art including a non-volatile memory, such as magnetic fixed disk storage, cloud-based memory, flash memory or the like. The processor 502 may also be in communication with other types of memory including random access memory 506 and read-only memory 508. The controller 500 may also include a display 510 that may show various states and indications associated with instructions executed by the processor 502. For example, the display 510 may display a failure of the linear actuation system 100 and implementation of the secondary lane system.

The controller 500 may be in communication with a plurality of input devices 512 and output devices 514. The plurality of input devices 512 may include user or pilot interface devices such as keyboard, mouse, buttons, and/or other peripheral devices to receive a user or pilot input. The user or pilot input may include initiation of the secondary lane system.

The plurality of input devices 512 may also include sensors in communication with various components of the linear actuation system 100, such as position sensors, motion sensors, speed sensors, voltage sensors, current sensor, and/or other detection devices known in the art. In particular, the sensors may include sensors to determine failure of the linear actuation system 100.

The plurality of output devices 514 may include various electrical and/or mechanical control devices that may be used to control various components of the linear actuation system 100, such as switches, electrical and/or electromagnetic relays, actuators, power modules, and/or other components known in the art. In particular, the output devices 514 may control the linear actuation system 100 to switch from the normal configuration to the field configuration.

The controller 500 may be in communication with, may be connected with, may be integrated into, and/or the like a flight computer, a central maintenance system (CMS), a flight management system (FMS), a flight warning system (FWS), and/or the like. In other aspects, the controller may be a standalone system integrated into the linear actuation system 100.

Figure 8:
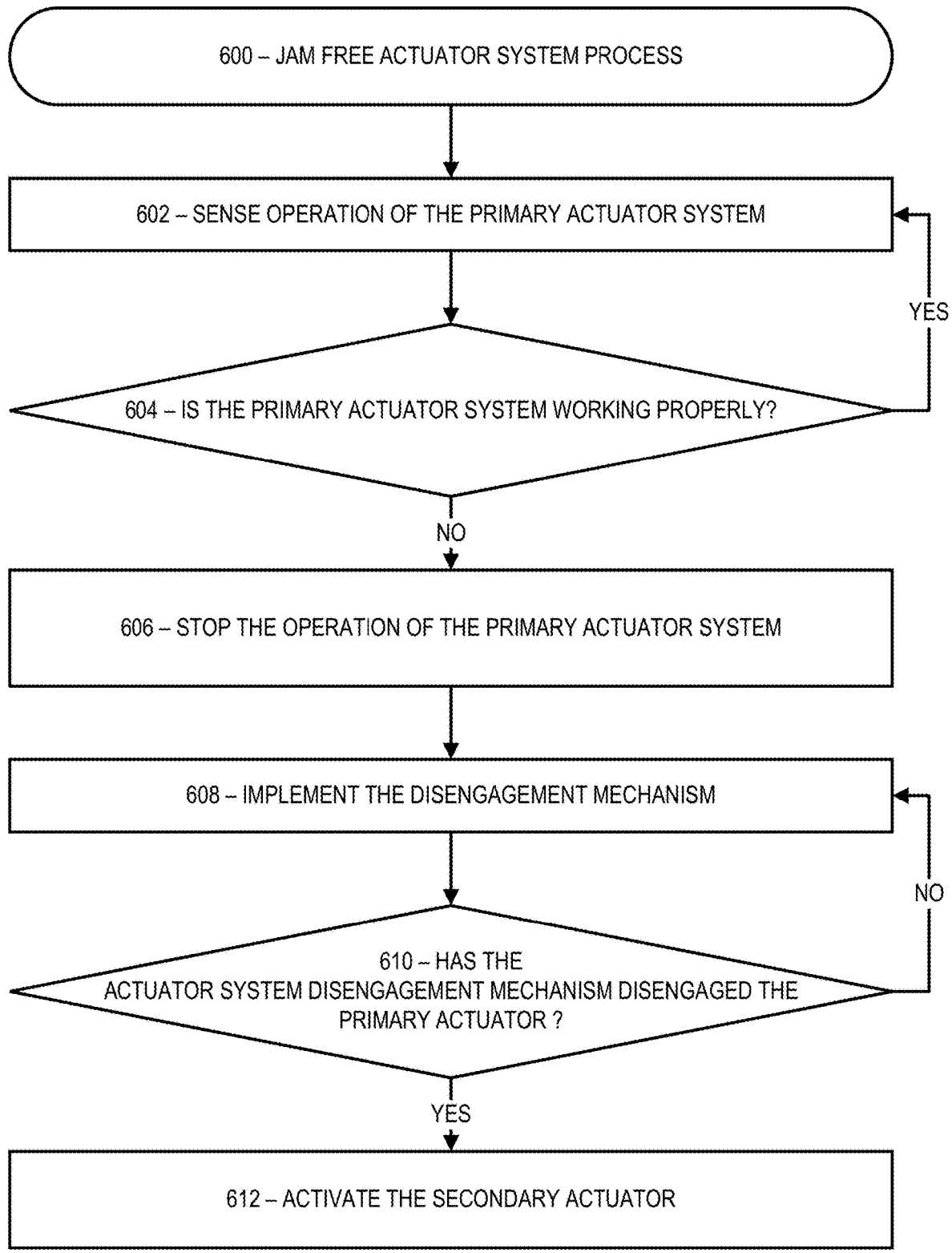
FIG. 8 illustrates a process of operating a linear actuation system according to FIG. 1.

FIG. 8 illustrates a process of operating a dual redundant actuator lane changer system according to FIG. 1.

In particular, FIG. 8 illustrates a jam free actuator system process 600 of the linear actuation system 100. During a normal operation mode of the linear actuation system 100, the linear actuation system 100 may be operated. In other words, the linear actuation system 100 may be in an active configuration or normal mode of operation.

With further reference to FIG. 8, the jam free actuator system process 600 may sense operation of the actuator system 602. In particular, the controller 500 implementing the jam free actuator system process 600 may receive signals from the linear actuation system 100 to sense the operation of the components associated with the linear actuation system 100. For example, the linear actuation system 100 may be able to detect motion of the linear actuation system 100 and/or the component 400 through a sensor as described herein. In particular, a sensor may be used to detect failure of the linear actuation system 100.

The jam free actuator system process 600 may determine whether the actuator is working properly 604. In particular, the controller 500 implementing the jam free actuator system process 600 may determine whether the linear actuation system 100 is operating properly. If the controller 500 does not sense any problems with the linear actuation system 100, the linear actuation system 100 may continue to operate. The controller 500 may return to step 602 and continue to receive signals from the linear actuation system 100 concerning the operation of the linear actuation system 100.

In some circumstances, the controller 500 may detect a problem in the linear actuation system 100. For example, a failure within the linear actuation system 100 may cause the linear actuation system 100 to seize or remain static. As a result, the linear actuation system 100 may not function properly. When a failure has been detected, the controller 500 operatively coupled to the linear actuation system 100 may advance to step 606.

Next, the controller 500 may stop the operation of the linear actuation system 606 and initiate the disengagement engagement mechanism 608. In particular, the controller 500 and/or the jam free actuator system process 600 may stop operation of the linear actuation system 100 and the jam free actuator system process 600 may initiate the disengagement mechanism 300 as described herein.

The jam free actuator system process 600 may determine whether the linear actuation system 100 has implemented the disengagement mechanism 610. For example, the controller 500 implementing the jam free actuator system process 600 may receive signals from the linear actuation system 100 to sense the operation of the components associated with the linear actuation system 100.

The jam free actuator system process 600 may activate the secondary lane actuation system 612. In particular, the controller 500 and/or the jam free actuator system process 600 may activate the secondary lane actuator motor.

In some aspects, the controller 500 may signal failure of the linear actuation system 100 to a flight warning system. For example, a warning message that the secondary lane system has been engaged may be sent to a flight computer, a pilot, a central maintenance system (CMS), a flight management system (FMS), a flight warning system (FWS), a cabin management system, and/or the like. The pilot may be notified via the display 510 or another output device 514 in communication with the controller 500. The controller 500 may provide additional diagnostic information related to the failure to the user or pilot based on information received from the input devices 512. For example, the controller 500 may notify the user or pilot of the type of failure by the linear actuation system 100.

The linear actuation system 100 may be configured to utilize outputs from sensing circuits monitored by the controller 500 to operate. The controller 500 may be configured to implement various safety protections for the linear actuation system 100. The safety protections may include over voltage protection, over current protections, overheat protections, short-circuit protections, and/or like.

In one aspect, the linear actuation system 100 and/or the controller 500 may operate in response to an aircraft system. The aircraft system may be a central maintenance system (CMS), a flight management system (FMS), a flight warning system (FWS), a cabin management system, or the like.

The linear actuation system 100 and/or the controller 500 may include Built-in test equipment (BITE). The Built-in test equipment (BITE) may be configured to address fault management and include diagnostic equipment built into airborne systems to support maintenance processes. The Built-in test equipment (BITE) may include sensors, multimeters, oscilloscopes, discharge probes, frequency generators, and/or the like to enable testing and perform diagnostics. The Built-in test equipment (BITE) may include the detection of the fault, the accommodation of the fault (how the system actively responds to the fault), the annunciation or logging of the fault to warn of possible effects and/or aid in troubleshooting the faulty equipment, or the like.

The controller 500 may be configured to process functions, provide other services, and/or the like. The controller 500 may include analog-to-digital converters, digital to analog converters, communication devices, an operating system, a touchscreen controller, a communications component, a graphics component, a contact/motion component, and/or the like to provide full functionality. In particular, the processor 502 may be configured to execute a software application configured to control the linear actuation system 100. In one aspect, the software application may be configured to interact with sensors, aircraft systems, and/or the like.

The controller 500 and/or the linear actuation system 100 may further include one or more sensors as described herein to sense a condition of the linear actuation system 100, an aircraft system, or the like. In particular, the one or more sensors may provide signals to the processor 502. The one or more sensors may include a current sensor, a voltage sensor, temperature sensor, and/or the like.

Accordingly, the linear actuation system 100 described is configured to implement the disengagement mechanism 300 in order to overcome mechanical failures and increase safety, reliability, limit equipment damage, and/or the like. In particular, the linear actuation system 100 may determine a failure in the linear actuation system 100, disconnect the linear actuation system 100 from the linear actuation system 100, and implement the secondary lane system in order to actuate the component 400.

Further in accordance with various aspects of the disclosure, the methods described herein are intended for operation with dedicated hardware implementations including, application specific integrated circuits (ASIC), programmable logic arrays, and other hardware devices constructed to implement the methods described herein.

It should also be noted that the software implementations of the disclosure as described herein are optionally stored on a tangible storage medium, such as: a magnetic medium such as a disk or tape; a magneto-optical or optical medium such as a disk; or a solid state medium such as a memory card or other package that houses one or more read-only (non-volatile) memories, random access memories, or other re-writable (volatile) memories. A digital file attachment to email or other self-contained information archive or set of archives is considered a distribution medium equivalent to a tangible storage medium. Accordingly, the disclosure is considered to include a tangible storage medium or distribution medium, as listed herein and including art-recognized equivalents and successor media, in which the software implementations herein are stored.

Additionally, the various aspects of the disclosure may be implemented in a non-generic computer implementation. Moreover, the various aspects of the disclosure set forth herein improve the functioning of the system as is apparent from the disclosure hereof. Furthermore, the various aspects of the disclosure involve computer hardware that it specifically programmed to solve the complex problem addressed by the disclosure. Accordingly, the various aspects of the disclosure improve the functioning of the system overall in its specific implementation to perform the process set forth by the disclosure and as defined by the claims.

The many features and advantages of the disclosure are apparent from the detailed specification, and, thus, it is intended by the appended claims to cover all such features and advantages of the disclosure, which fall within the true spirit, and scope of the disclosure. Further, since numerous modifications and variations will readily occur to those skilled in the art, it is not desired to limit the disclosure to the exact construction and operation illustrated and described, and, accordingly, all suitable modifications and equivalents may be resorted to that fall within the scope of the disclosure.

What is claimed is:

1. A jam free linear actuator system comprising:
    a linear electro-mechanical actuator configured to actuate a component;
    a disengagement mechanism configured to disengage components of the linear electro-mechanical actuator in an event of a jammed failure;
    a fixed end fitting mechanical connection; and
    a trim end fitting mechanical connection,
    wherein the linear electro-mechanical actuator comprises an actuator power screw and an actuation motor configured to drive the actuator power screw in order to change relative positions of the fixed end fitting mechanical connection with respect to the trim end fitting mechanical connection in order to operate the component;
    wherein the fixed end fitting mechanical connection connects the linear electro-mechanical actuator to a portion of a system implementing the linear electro-mechanical actuator; and
    wherein the trim end fitting mechanical connection connects the linear electro-mechanical actuator to the component.

2. The jam free linear actuator system according to claim 1 wherein the disengagement mechanism is configured to disengage a ram from a power screw or a screw nut.

3. The jam free linear actuator system according to claim 1 wherein the trim end fitting mechanical connection is configured to operate a control surface.

4. The jam free linear actuator system according to claim 1 wherein the component is connected to a control surface of an aircraft.

5. The jam free linear actuator system according to claim 4 wherein the control surface comprises at least one of the following: an aileron, an elevator, a ruddervator, leading-edge flaps, leading-edge slots, ground spoilers, an inboard flap, an inboard aileron, an inboard aileron tab, an outboard flap, a balance tab, an outboard aileron, a flight spoiler, a trim tab, slats, air brakes, an elevator trim, a control horn, a rudder trim, and an aileron trim.

6. The jam free linear actuator system according to claim 1 wherein the linear electro-mechanical actuator further comprises:
    an actuator power screw; and
    an actuation motor configured to drive the actuator power screw in order to change relative positions of the fixed end fitting mechanical connection with respect to the trim end fitting mechanical connection in order to operate the component.

7. The jam free linear actuator system according to claim 6 wherein the linear electro-mechanical actuator further comprises:
    transmission components configured to connect the actuation motor to the actuator power screw,
    wherein the transmission components are configured transfer a rotation of the actuation motor to the actuator power screw.

8. The jam free linear actuator system according to claim 7 wherein the transmission components comprise at least one of the following: a motor or a gear train.

9. The jam free linear actuator system according to claim 7 wherein the linear electro-mechanical actuator further comprises:
    a ram connected to the trim end fitting mechanical connection and configured to extend the trim end fitting mechanical connection; and
    a screw nut connected to the actuator power screw.

10. The jam free linear actuator system according to claim 9 wherein the disengagement mechanism comprises a coupling nut configured to engage the ram, a floating nut, a wheel, a worm, and a rotational anti-rotation guide.

11. The jam free linear actuator system according to claim 10 wherein the rotational anti-rotation guide is configured to hold the floating nut, the coupling nut, the screw nut, and the ram.

12. The jam free linear actuator system according to claim 11 wherein the disengagement mechanism is configured to drive the worm and the wheel, or other type drive train, with a disengagement motor/brake and drive and rotate the rotational anti-rotation guide.

13. The jam free linear actuator system according to claim 11 wherein during normal operation, the screw nut is driven by the actuator power screw.

14. The jam free linear actuator system according to claim 12 wherein the linear electro-mechanical actuator is configured during a jam to operate the disengagement motor/brake and the disengagement motor/brake is configured to drive the rotational anti-rotation guide, which turns the coupling nut to disengage from the screw nut and the ram so that the ram will be free to move.

15. The jam free linear actuator system according to claim 1 wherein the linear electro-mechanical actuator further comprises:
    a controller configured to detect a jam and activate the disengagement mechanism.

* * * * *